US009548043B2

(12) United States Patent
Liu et al.

(10) Patent No.: US 9,548,043 B2
(45) Date of Patent: Jan. 17, 2017

(54) PIXEL VALUE INTERPOLATION METHOD AND SYSTEM

(71) Applicant: NOVATEK Microelectronics Corp., Hsin-Chu (TW)

(72) Inventors: Guangzhi Liu, Shanghai (CN); Bo Zhao, Chengdu (CN)

(73) Assignee: NOVATEK Microelectronics Corp., Hsin-Chu (TW)

( * ) Notice: Subject to any disclaimer, the term of this patent is extended or adjusted under 35 U.S.C. 154(b) by 632 days.

(21) Appl. No.: 14/073,885

(22) Filed: Nov. 7, 2013

(65) Prior Publication Data

US 2015/0029240 A1 Jan. 29, 2015

(30) Foreign Application Priority Data

Jul. 24, 2013 (CN) .......................... 2013 1 0313801

(51) Int. Cl.
*G06K 9/32* (2006.01)
*G09G 5/391* (2006.01)
(Continued)

(52) U.S. Cl.
CPC ............ *G09G 5/391* (2013.01); *G09G 3/2074* (2013.01); *G09G 5/005* (2013.01);
(Continued)

(58) Field of Classification Search
None
See application file for complete search history.

(56) References Cited

U.S. PATENT DOCUMENTS 5,945,997 A * 8/1999 Zhao ....................... G06T 11/40 345/581
7,620,109 B2 11/2009 Srinivasan
(Continued)

FOREIGN PATENT DOCUMENTS

CN 102521794 A 6/2012
TW 200737038 10/2007
(Continued)

OTHER PUBLICATIONS

S. Pelletier and J. R. Cooperstock, "Preconditioning for Edge-Preserving Image Super Resolution," in IEEE Transactions on Image Processing, vol. 21, No. 1, pp. 67-79, Jan. 2012.*
(Continued)

*Primary Examiner* — Andrae S Allison
(74) *Attorney, Agent, or Firm* — Winston Hsu; Scott Margo

(57) ABSTRACT

A data interpolation method is utilized for obtaining an interpolation data of an interpolation point in a destination data, and a data number of the destination data has a horizontal magnification factor and a vertical magnification factor compared to a data number of a source data. The data interpolation method includes obtaining an input data from the source data according to an interpolation position of the interpolation point corresponding to the destination data, the horizontal magnification factor, and the vertical magnification factor, wherein the input data includes a plurality of input pixel values corresponding to a plurality of pixels; performing at least one reordering and interpolation calculating process on the plurality of input pixel values to obtain a plurality of output pixel values; and selecting an output pixel value from the plurality of output pixel values and outputting the output pixel value as the interpolation data of the interpolation point.

18 Claims, 5 Drawing Sheets

(51) Int. Cl.
*G09G 3/20* (2006.01)
*G09G 5/00* (2006.01)

(52) U.S. Cl.
CPC ............... *G09G 2340/0414* (2013.01); *G09G 2340/0421* (2013.01); *G09G 2340/0457* (2013.01); *G09G 2340/10* (2013.01)

(56) References Cited

U.S. PATENT DOCUMENTS

2004/0246377 A1* 12/2004 Matoba .................. H04N 9/735 348/581
2009/0252405 A1* 10/2009 Lee ......................... G06T 5/001 382/159
2010/0027679 A1* 2/2010 Sunahara ........... H04N 21/2381 375/240.24
2011/0157199 A1* 6/2011 Vitella-Espinoza ...... G06T 1/60 345/541
2012/0027079 A1* 2/2012 Ye ........................ H04N 19/597 375/240.02
2013/0308704 A1* 11/2013 Park ....................... H04N 19/51 375/240.16
2015/0010230 A1* 1/2015 Zhou .................. G06K 9/00536 382/154
2016/0165243 A1* 6/2016 Nakagami .............. H04N 19/34 375/240.08

FOREIGN PATENT DOCUMENTS

| | | |
|---|---|---|
| TW | I331733 | 10/2010 |
| TW | 201301199 | 1/2013 |
| TW | 201310388 | 3/2013 |

OTHER PUBLICATIONS

S. Pelletier and J. R. Cooperstock, “Fast Super-Resolution for Rational Magnification Factors,” 2007 IEEE International Conference on Image Processing, San Antonio, TX, 2007, pp. II-65-II-68.*
N. Nguyen, P. Milanfar, and G. H. Golub, “A computationally efficient superresolution image reconstruction algorithm.,” IEEE Transactions on Image Processing, vol. 10, No. 4, pp. 573-583, 2001.*

* cited by examiner

PIXEL VALUE INTERPOLATION METHOD AND SYSTEM

BACKGROUND OF THE INVENTION

1. Field of the Invention

The present invention relates to a data interpolation method and a data interpolation system, and more particularly, to a data interpolation method and a data interpolation system capable of increasing accuracy of data interpolation.

2. Description of the Prior Art

A display device may perform data interpolation on a source image to increase a pixel number of the source image for generating a high-resolution image. For example, the high-resolution image having 1024×768 pixels is generated from a source image having 640×480 pixels by performing the data interpolation, and then the high-resolution image may be outputted to the display device having a high-resolution displaying functionality for displaying, such that people can watch the high-resolution image.

In the prior art, the data interpolation is performed on pixel values of a plurality of input pixels in the source image by a liner or a bi-linear algorithm to obtain pixel values of a plurality of interpolation pixels located between corresponding input pixels of the plurality of input pixels. For the linear algorithm, pixel values of two pixels A and B in the source image are summed and then divided by 2 to obtain a pixel value of an interpolation pixel located between the pixels A and B. For the bi-linear algorithm, pixel values of four pixels A, B, C and D in the source image are multiplied by corresponding distance ratios of the pixels A, B, C and D relative to an interpolation pixel, and then summed and divided by 4 to obtain a pixel value of the interpolation pixel located between the pixels A, B, C and D.

However, in the prior art, the pixel values of the multiple input pixels corresponding to the interpolation pixel are directly summed and averaged, or the pixel values of the multiple input pixels are multiplied by the ratios, summed, and averaged to calculate the pixel value of the interpolation pixel. Under such a condition, visible stripes and blocks may appear in the interpolated high-resolution image. Thus, there is a need for improvement of the prior art.

SUMMARY OF THE INVENTION

It is therefore an objective of the present invention to provide a data interpolation method and a data interpolation system capable of increasing accuracy of data interpolation.

The present invention discloses a data interpolation method, for obtaining an interpolation data of an interpolation point in a destination data, and a data number of the destination data has a horizontal magnification factor and a vertical magnification factor compared to a data number of a source data. The data interpolation method comprises obtaining an input data from the source data according to an interpolation position of the interpolation point corresponding to the destination data, the horizontal magnification factor, and the vertical magnification factor, wherein the input data comprises a plurality of input pixel values corresponding to a plurality of pixels; performing at least one reordering and interpolation calculating process on the plurality of input pixel values to obtain a plurality of output pixel values; and selecting an output pixel value from the plurality of output pixel values and outputting the output pixel value as the interpolation data of the interpolation point.

The present invention further discloses a data interpolation system, for obtaining an interpolation data of an interpolation point in a destination data, and a data number of the destination data has a horizontal magnification factor and a vertical magnification factor compared to a data number of a source data. The data interpolation system comprises a processor; and a storage device, storing a program code for indicating to the processor to perform a data interpolation method, and the data interpolation method comprising obtaining an input data from the source data according to an interpolation position of the interpolation point corresponding to the destination data, the horizontal magnification factor, and the vertical magnification factor, wherein the input data comprises a plurality of input pixel values corresponding to a plurality of pixels; performing at least one reordering and interpolation calculating process on the plurality of input pixel values to obtain a plurality of output pixel values; and selecting an output pixel value from the plurality of output pixel values and outputting the output pixel value as the interpolation data of the interpolation point.

These and other objectives of the present invention will no doubt become obvious to those of ordinary skill in the art after reading the following detailed description of the preferred embodiment that is illustrated in the various figures and drawings.

DETAILED DESCRIPTION

In following embodiments of the present invention, a data interpolation system reads a source data and performs interpolation computation to generate an interpolation data according to a data interpolation process. Accordingly, the data interpolation system reorders a position sequence of an input data required for generating the interpolation data and performs the interpolation computation to increase accuracy of data interpolation. For clearly illustrating the present invention, at least one embodiment is described with figures in the following.

Figure 1:
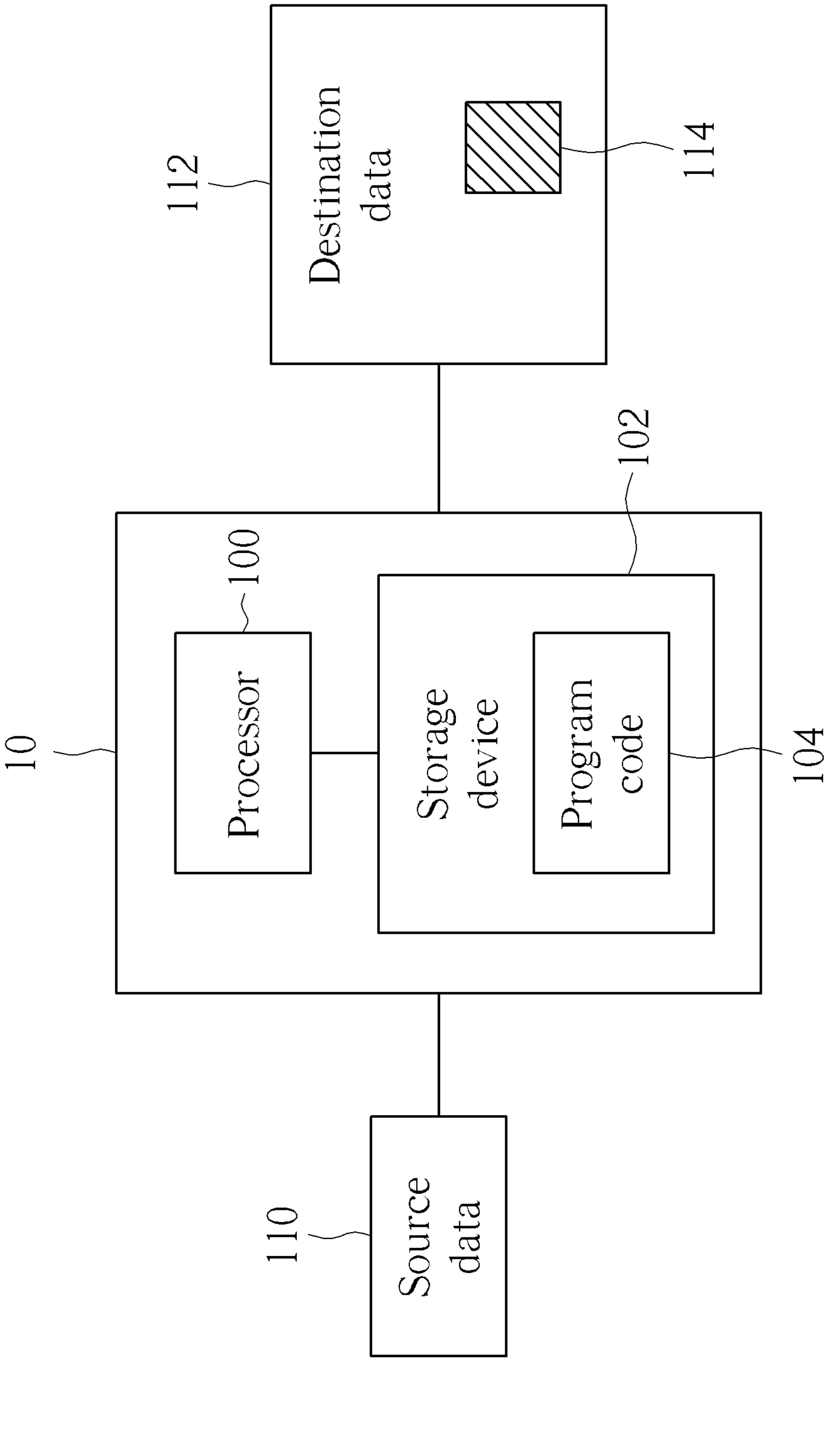
FIG. 1 is a schematic diagram of a data interpolation system according to an embodiment of the present invention.

Please refer to FIG. 1, which is a schematic diagram of a data interpolation system 10 according to an embodiment of the present invention. As shown in FIG. 1, the data interpolation system 10 includes a processor 100 and a storage device 102. The data interpolation system 10 is utilized in a computer, a smart television, a smart phone, or a tablet, etc, for reading a source data 110 and performing interpolation computation to generate an interpolation data 114 in a destination data 112. The source data 110 includes pixel values of all pixels in a source image, and the destination data 112 includes pixel values of all pixels in a destination image. The interpolation data 114 is a pixel value of a pixel in the destination image, and the pixel corresponding to the interpolation data 114 may be labeled as an interpolation point DST. The source image and the destination image may be a static picture, a frame of a dynamic video, or a multi-views two-dimensional image, etc, and are not limited hereinafter.

Additionally, after the data interpolation system 10 generates the interpolation data 114 of the interpolation point DST, the data interpolation system 10 may sequentially generate pixel values of other pixels in the destination image to obtain the pixel values of all pixels in the destination image, so as to increase resolution of the source image to generate the high-resolution destination image. In such a condition, a data number of the destination data 112 has a horizontal magnification factor HF and a vertical magnification factor VF compared to a data number of a source data 110.

The processor 100 may be implemented by an application specific integrated circuit (ASIC). The storage device 102 is a read-only memory (ROM), a random-access memory (RAM), a CD-ROM, a magnetic tape, a floppy disk, or an optical data storage device, etc, and is not limited herein. The storage device 102 is utilized for storing a program code 104, which indicates to the processor 100 to read the source data 110 and perform the interpolation computation for generating the interpolation data 114 of the interpolation point DST in the destination data 112. Notably, the data interpolation system 10 may also be directly implemented by an ASIC to read the source data 110 and perform the interpolation computation, which is not limited hereinafter.

Figure 2:
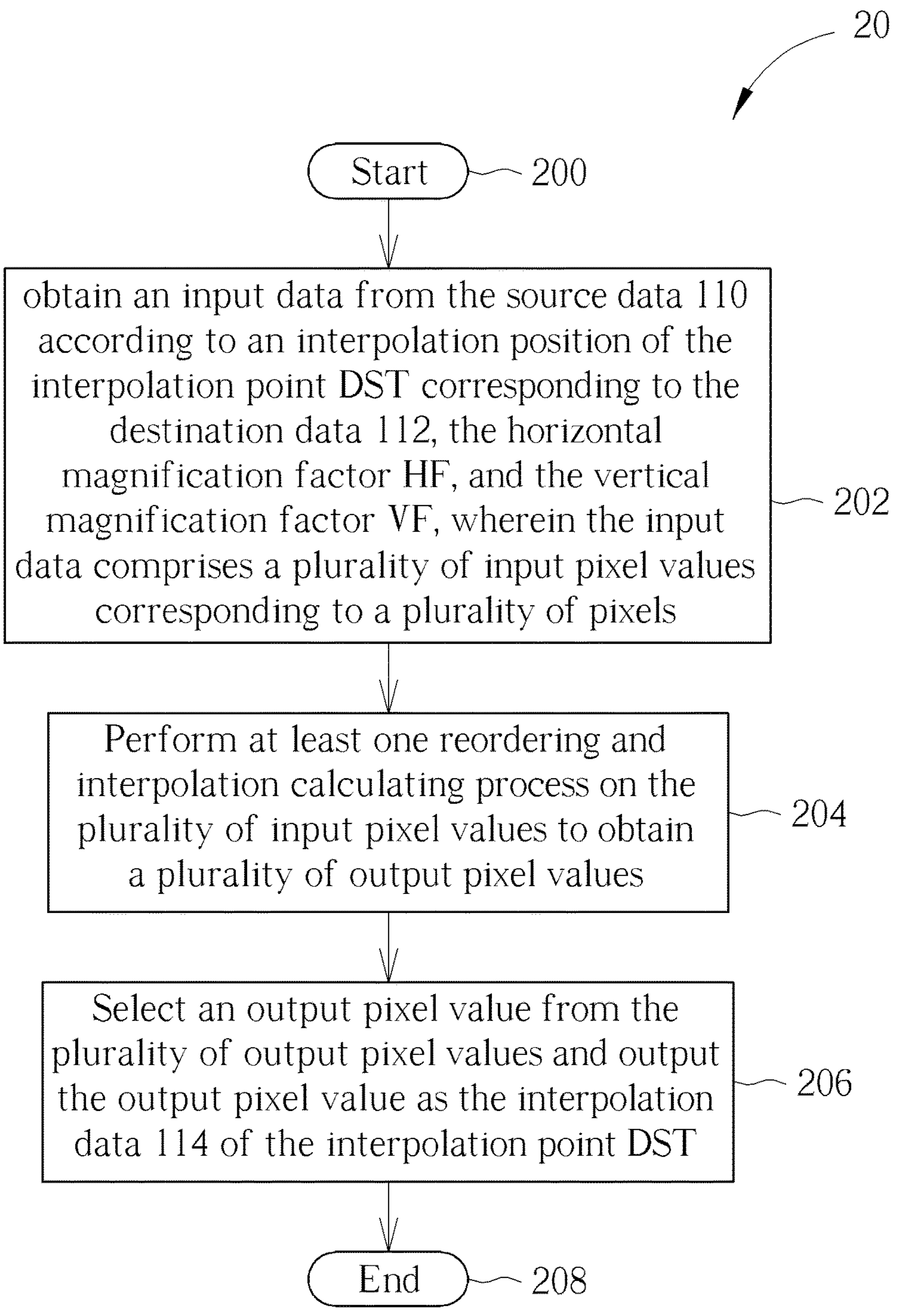
FIG. 2 is a schematic diagram of a data interpolation process according to an embodiment of the present invention.

Specifically, a process of the data interpolation system 10 reading the source data 110 and performing the interpolation computation to generate the interpolation data 114 in the destination data 112 may refer to FIG. 2, which is a schematic diagram of a data interpolation process 20 according to an embodiment of the present invention. In the embodiment, the data interpolation process 20 may be compiled as the program code 104, which is stored in the storage device 102 to indicate to the processor 100 to read the source data 110 and perform the interpolation computation for generating the interpolation data 114. As shown in FIG. 2, the data interpolation process 20 includes the following steps:

Step 200: start.

Step 200: obtain an input data from the source data 110 according to an interpolation position of the interpolation point DST corresponding to the destination data 112, the horizontal magnification factor HF, and the vertical magnification factor VF, wherein the input data comprises a plurality of input pixel values corresponding to a plurality of pixels.

Step 204: perform at least one reordering and interpolation calculating process on the plurality of input pixel values to obtain a plurality of output pixel values.

Step 204: select an output pixel value from the plurality of output pixel values and output the output pixel value as the interpolation data 114 of the interpolation point DST.

Step 208: end.

According to the data interpolation process 20, after the interpolation data 114 of the interpolation point DST is generated, the data of other pixels may also be generated similarly by the data interpolation process 20, so as to obtain the destination data 112 corresponding to all pixels of the destination image.

In detail, in step 202, the source data 110 includes the pixel values of all pixels in the source image, and the destination data 112 includes the pixel values of all pixels in the destination image. All pixels of the source image and the destination image forming two dimensional images may be respectively defined as corresponding coordinate axes. The interpolation position of the interpolation point DST has a coordinate in the defined coordinate axis corresponding to the destination image, and the coordinate includes a horizontal coordinate and a vertical coordinate. For example, when all pixels of the destination image form a two dimensional 1024 (horizontal)×768 (vertical) pixels image, the interpolation position of the interpolation point DST has a coordinate in the 1024 (horizontal)×768 (vertical) coordinate axis, and the coordinate includes a horizontal coordinate and a vertical coordinate. Then, a reference pixel coordinate may be obtained by respectively dividing the horizontal coordinate and the vertical coordinate of the interpolation point DST by the horizontal magnification factor HF and the vertical magnification factor VF. Finally, pixel values of a plurality of pixels located around the reference pixel coordinate may be obtained from the source data 110 based on the defined coordinate axis corresponding to the source image to be the plurality of input pixel values of the input data.

In step 204, the plurality of input pixel values of the input data are utilized for reordering according to the corresponding positions by the at least one reordering and interpolation calculating process and the interpolation computation is performed on the reordered pixel values to obtain a plurality of output pixel values. The operations of each reordering and interpolation calculating process of the at least one reordering and interpolation calculating process are all the same, and only input data of individual process is different. For distinguishing the input data generated in step 202, the input data of each reordering and interpolation calculating process is defined as a temporal input data for representing the input data temporally required for the computation of each reordering and interpolation calculating process.

When the at least one reordering and interpolation calculating process only includes one reordering and interpolation calculating process, the temporal input data of the only one reordering and interpolation calculating process is the input data generated in step 202, and the plurality of temporal input pixel values of the temporal input data is the plurality of input pixel value of the input data. The plurality of temporal input pixel values are utilized for reordering and interpolation calculation to obtain the plurality of temporal output pixel values of a temporal output data. Since the at least one reordering and interpolation calculating process only includes one reordering and interpolation calculating process, the plurality of temporal output pixel values of the temporal output data is the plurality of output pixel values in step 204 of the data interpolation process 20.

On the other hand, when the at least one reordering and interpolation calculating process includes multiple reordering and interpolation calculating processes (such as two, three, or four processes), the temporal input data of a first process is the input data in step 202. The temporal input data of the first process is utilized for the reordering and interpolation computation to generate a temporal output data of the first process. Then, the temporal output data of the first process is outputted to a second process to be a temporal input data of the second process. Similarly, the temporal input data of the second process is utilized for the reordering and interpolation computation to generate a temporal output data of the second process and the temporal output data of the second process is outputted to a next process to be a temporal input data of the next process. The operations are sequentially performed until a last process is completed. When a temporal input data of the last process is utilized for the reordering and interpolation computation, a temporal output data of the last process may be obtained. The temporal output data of the last process includes a plurality of temporal output pixel values to be the plurality of output pixel values of the data interpolation process 20.

In step 206, an output pixel value is selected from the plurality of output pixel values and the interpolation data 114 of the interpolation point DST is outputted.

As a result, in the data interpolation process 20, the reference pixel coordinate may be calculated according to the interpolation position of the interpolation point DST in the destination image, the horizontal magnification factor HF and the vertical magnification factor VF to obtain the input data required for generating the interpolation data 114. In addition, in the data interpolation process 20, the input data is not simply summed and averaged, and the input data is utilized for the reordering and interpolation computation according to the corresponding position to generate the interpolation data of the interpolation point. Stripes and blocks may not appear in the interpolated destination image, and the accuracy of the data interpolation may be increased.

Moreover, when the horizontal magnification factor HF and the vertical magnification factor VF are larger, the data interpolation process 20 may perform one reordering and interpolation calculating process to generate a temporal output data corresponding to horizontal and vertical magnification factors with smaller values, and then the data interpolation process 20 performs a next reordering and interpolation calculating process to generate a temporal output data corresponding to horizontal and vertical magnification factors with another smaller values. Finally, the interpolation data corresponding to the horizontal magnification factor HF and the vertical magnification factor VF may be obtained. Thereby, for the requirement of the horizontal magnification factor HF and the vertical magnification factor VF with larger values, the data interpolation process 20 may perform multiple reordering and interpolation calculating processes to easily obtain the interpolation data of the interpolation point, such that the computation of the data interpolation may be more regular and more easily implemented. Simultaneously, the interpolation data also may be more accurate.

Figure 3:
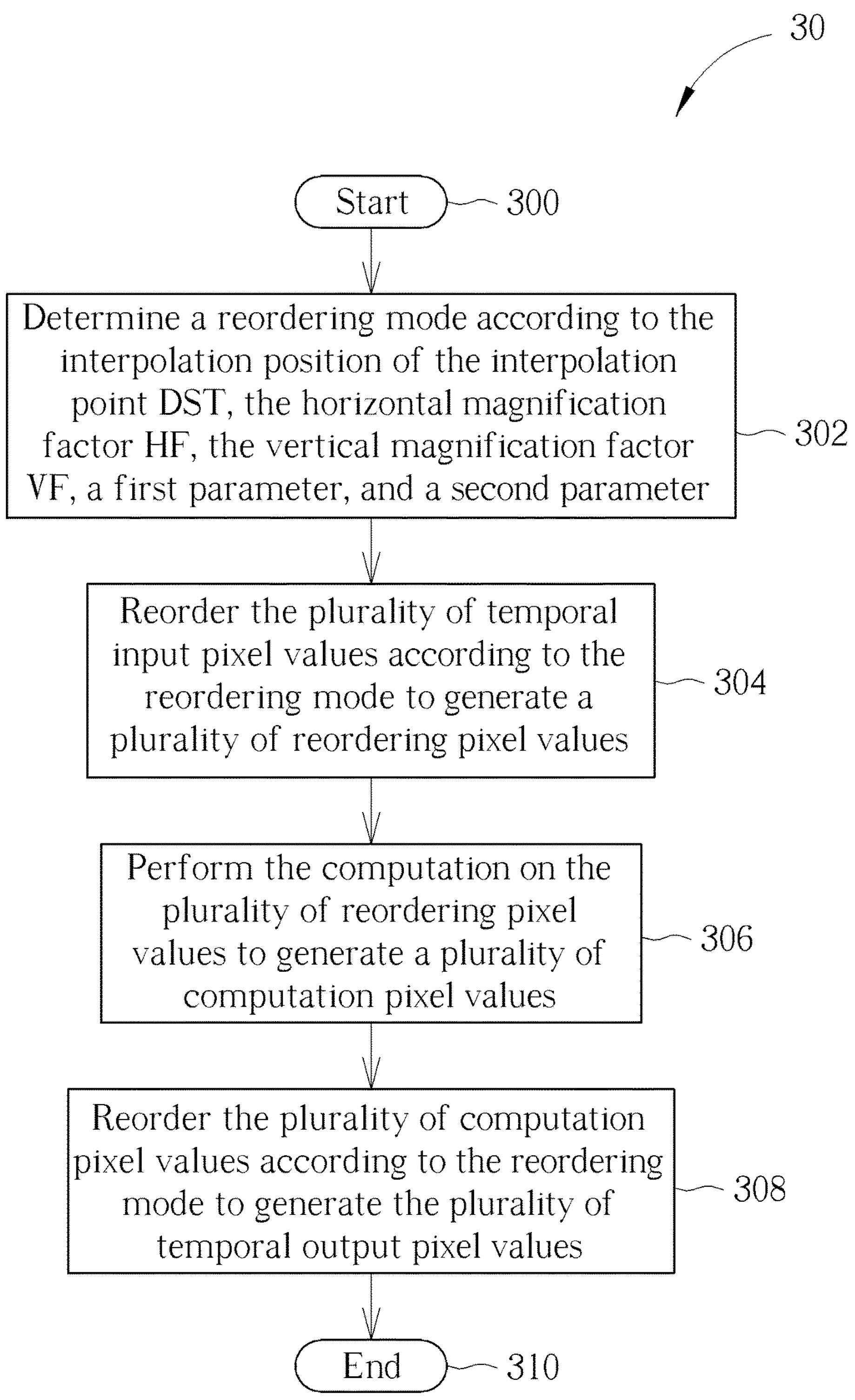
FIG. 3 is a schematic diagram of a reordering and interpolation calculating process according to an embodiment of the present invention.

A detailed operation of each reordering and interpolation calculating process of the at least one reordering and interpolation calculating process is illustrated in FIG. 3, which is a schematic diagram of a reordering and interpolation calculating process 30 according to an embodiment of the present invention. In the embodiment, the reordering and interpolation calculating process 30 similarly may also be compiled as the program code 104, which is stored in the storage device 102 to indicate to the processor 100 to perform reordering and interpolation computation. As shown in FIG. 3, the reordering and interpolation calculating process 30 includes the following steps:

Step 300: start.

Step 302: determine a reordering mode according to the interpolation position of the interpolation point DST, the horizontal magnification factor HF, the vertical magnification factor VF, a first parameter, and a second parameter.

Step 304: reorder the plurality of temporal input pixel values according to the reordering mode to generate a plurality of reordering pixel values.

Step 306: perform the computation on the plurality of reordering pixel values to generate a plurality of computation pixel values.

Step 308: reorder the plurality of computation pixel values according to the reordering mode to generate the plurality of temporal output pixel values;

Step 310: end.

According to the reordering and interpolation calculating process 30, the first parameter is related to an amount of the at least one reordering and interpolation calculating process, and the second parameter is related to an order of an executing reordering and interpolation calculating process relative to the at least one reordering and interpolation calculating process.

In step 302, the reordering mode is determined according to the interpolation position of the interpolation point DST, the horizontal magnification factor HF, the vertical magnification factor VF, the first parameter, and the second parameter. The first parameter is obtained by calculating 2 to the power of a process amount. The process amount is the amount of the at least one reordering and interpolation calculating process. For example, when the at least one reordering and interpolation calculating process only includes one reordering and interpolation calculating process, the first parameter is 2 to the power of 1, which is equal to 2. When the at least one reordering and interpolation calculating process includes two reordering and interpolation calculating processes, the first parameter is 2 to the power of 2, which is equal to 4.

The second parameter is obtained by calculating 2 to power of a value of a process order minus 1, and the process order is the order of the executing reordering and interpolation calculating process relative to the at least one reordering and interpolation calculating process. For example, when the executing reordering and interpolation calculating process is the first reordering and interpolation calculating process of the at least one reordering and interpolation calculating process, the second parameter is 2 to the power of 0, which is equal to 1. When the executing reordering and interpolation calculating process is the second reordering and interpolation calculating process of the at least one reordering and interpolation calculating process, the second parameter is 2 to power of 1, which is equal to 2.

Next, the horizontal coordinate and the vertical coordinates of the interpolation point DST, the first parameter, the second parameter, the horizontal magnification factor HF, and the vertical magnification factor VF may be substituted into the following two formulas for respectively obtaining a horizontal determination parameter and a vertical determination parameter:

$$H\_DP=((HC*PA1)/H\_MF)\bmod(2*PA2);\text{and} \qquad \text{Formula 1}$$

$$V\_DP=((VC*PA1)/V\_MF)\bmod(2*PA2); \qquad \text{Formula 2}$$

wherein, H_DP and V_DP represent the horizontal determination parameter and the vertical determination parameter, HC and VC represent the horizontal coordinate and the vertical coordinate of the interpolation point DST, H_MF and V_MF represent the horizontal magnification factor HF and the vertical magnification factor VF, PA1 represents the first parameter, PA2 represents the second parameter, and mod represents to calculate a remainder.

Finally, the horizontal determination parameter may be determined whether to be greater than or equal to the second parameter to generate a first determination result, and the vertical determination parameter may be determined whether to be greater than or equal to the second parameter to generate a second determination result. When the first determination result indicates the horizontal determination parameter is greater than or equal to the second parameter, the reordering mode is determined to perform a horizontal reorder. When the second determination result indicates the vertical determination parameter is greater than or equal to the second parameter, the reordering mode is determined to perform a vertical reorder In step 304, the plurality of temporal input pixel values are utilized for the reordering according to the reordering mode indicating whether to perform the horizontal reorder or the vertical reorder. When the reordering mode indicates only to perform the horizontal reorder, the plurality of temporal input pixel values may be horizontally replaced based on an overall center according to the coordinates of the plurality of temporal input pixels corresponding to the plurality of temporal input pixel values. When the reordering mode indicates only to perform the vertical reorder, the plurality of temporal input pixel values may be vertically replaced based on the overall center according to the coordinates of the plurality of temporal input pixels corresponding to the plurality of temporal input pixel values. When the reordering mode indicates to perform the horizontal and the vertical reorder, the plurality of temporal input pixel values may be horizontally and vertically replaced based on the overall center according to the coordinate of the plurality of temporal input pixels corresponding to the plurality of temporal input pixel values. After the reordering is performed on the plurality of temporal input pixel values, the plurality of reordering pixel values may be generated. Notably, when the reordering mode indicates not to perform the horizontal and the vertical reorder, the plurality of temporal input pixel values are not reordered to directly generate the plurality of reordering pixel values.

In steps 306-308, the plurality of reordering pixel values may be further be utilized for the computation with at least one interpolation coefficient. Under such a situation, filtering, such as marginalization or defuzzification, is performed on the plurality of reordering pixel values, and the interpolation result may be more complied with the image. After the computation is performed on the plurality of reordering pixel values, the plurality of computation pixel values are generated and then replaced to the original positions by performing the above-mentioned reorder according to the reordering mode to output the temporal output pixel values.

As a result, the reordering and interpolation calculating process 30 determines whether to perform the horizontal or vertical reorder according to the interpolation position of the interpolation point DST, the horizontal magnification factor HF, the vertical magnification factor VF, the first parameter related to the process amount, and the second parameter related to the process order, and the reordering and interpolation calculating process 30 to obtain the reordering mode for performing reordering. Then, the reordering and interpolation calculating process 30 performs the computation with the interpolation coefficients. Thereby, each reordering and interpolation calculating process of the at least one reordering and interpolation calculating process may dynamically perform the best reordering methods according to the interpolation position and the order of the executing process to generate the interpolation data of the interpolation point, so as to increase the accuracy of the data interpolation.

Figure 4:
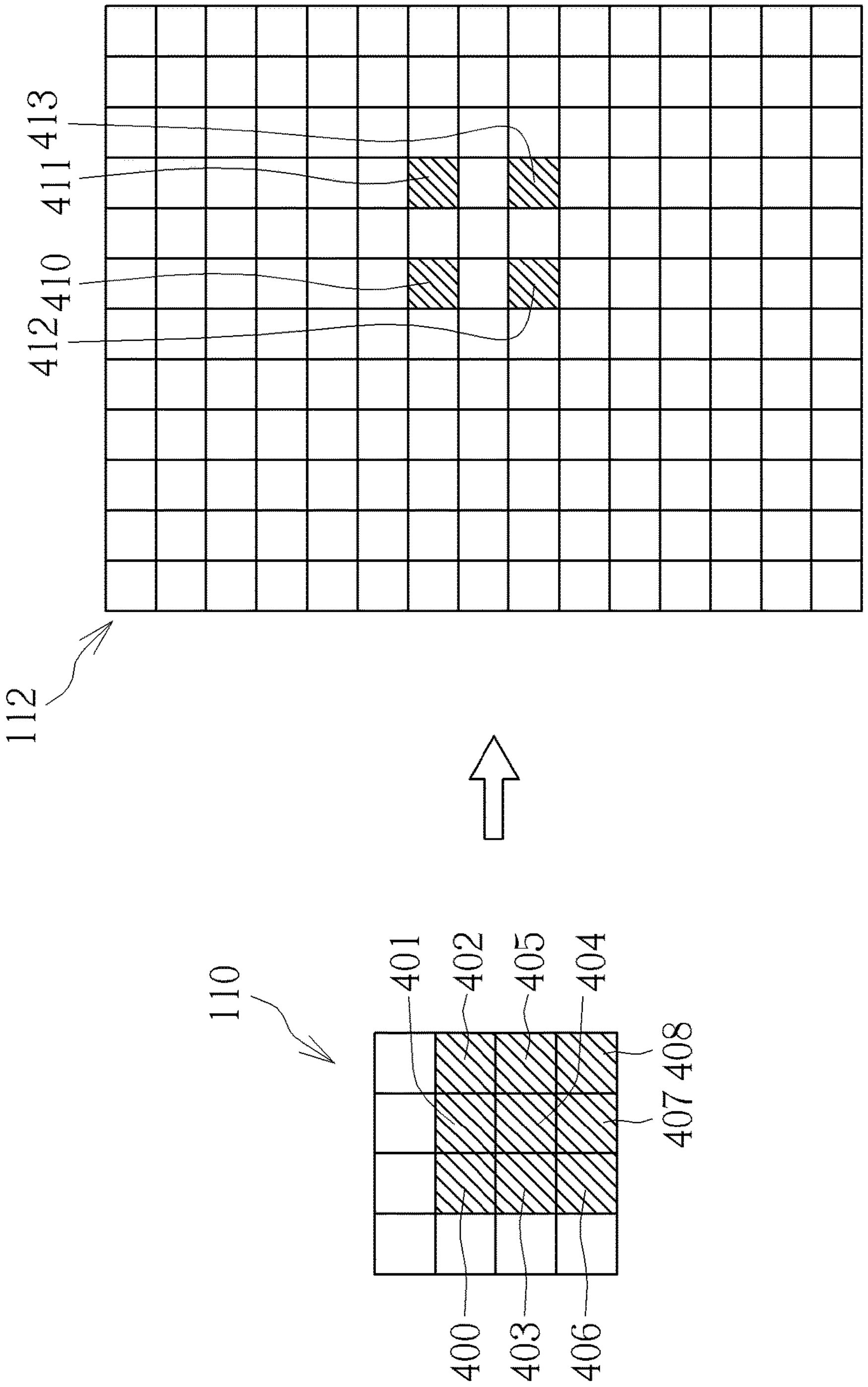
FIG. 4 is a schematic diagram of a source data and a destination data in a data interpolation system according to an embodiment of the present invention.
Figure 5:
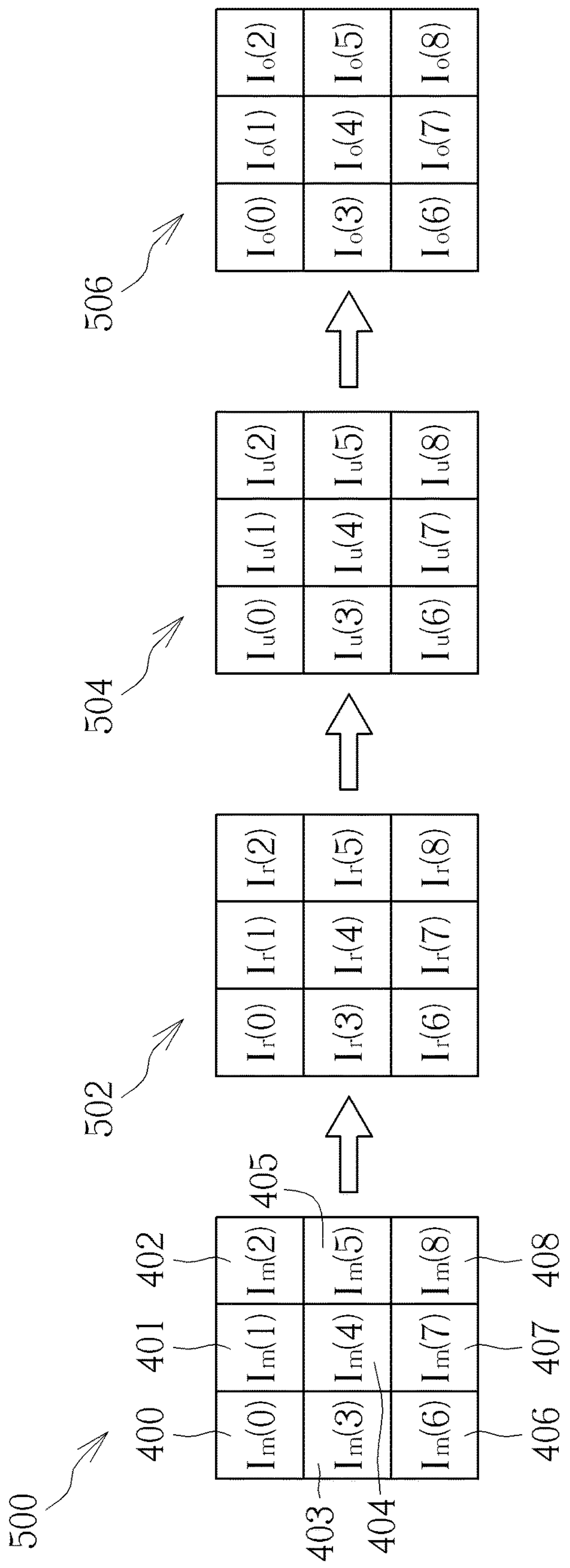
FIG. 5 is a schematic diagram of an input data from the source data in FIG. 4 performed computation according to a reordering and interpolation calculating process.

On the other hand, detailed operations of the data interpolation process 20 in the data interpolation system 10 may be referred to in FIG. 4 and FIG. 5. FIG. 4 is a schematic diagram of the source data 110 and the destination data 112 in a data interpolation system 10 according to an embodiment of the present invention. As shown in FIG. 4, the source data 110 includes 4 (horizontal)×4 (vertical) pixel values in the source image, and the destination data 112 includes 12 (horizontal)×12 (vertical) pixel values in the destination image. Thus, the data number of the destination data 112 has the horizontal magnification factor HF equal to 3 and the vertical magnification factor VH equal to 3 compared to the data number of the source data 110.

When the interpolation point DST is the pixel 410, the interpolation position of the interpolation point DST in the defined coordinate axis has coordinate (6,6). The reference pixel coordinate may be obtained as (2,2) by respectively diving the horizontal coordinate and the vertical coordinate of the interpolation point DST by the horizontal magnification factor HF and the vertical magnification factor VF. Noticeably, in the embodiment, when a non-integer value is obtained after the horizontal coordinate and the vertical coordinate of the interpolation point DST are divided by the horizontal magnification factor HF and the vertical magnification factor VF, the decimal value is rounded off for easily explaining, which also can make different alterations accordingly and is not limited.

Next, pixels 400-408 are obtained from the left-up, up, right-up, left, center, right, left-down, down and right-down positions located around the reference pixel, i.e. coordinate (2,2). The pixel values corresponding to the pixels 400-408 may be generated to be the input data for generating the pixel value of the pixel 410 in the data interpolation process 20. Similarly, when the interpolation point DST is respectively the pixels 411-413, the interpolation positions of the pixels 411-413 in the defined coordinate axis have coordinate (8,6), (6,8), and (8,8). The reference pixel coordinate may be calculated to also be (2,2), wherein the decimal value is rounded off for easily explaining and can make different alterations accordingly. Then, the input data required for generating the pixel values of the pixels 411-413 also includes the pixel values of the pixels 400-408.

In an embodiment, when the data interpolation process 20 only includes one reordering and interpolation calculating process, the input data obtained from the source data 110 is performed upon by the reordering and interpolation calculating once according to the reordering and interpolation calculating process 30. First, the first parameter and the second parameter are calculated to determine the reordering mode of the reordering and interpolation calculating process 30. The first parameter may be obtained to be 2 by calculating 2 to power of the process amount (i.e. 1), and the second parameter may be obtained to be 1 by calculating 2 to power of the value of the process order minus 1 (i.e. 1−1=0).

When the interpolation point DST is pixel 410, the coordinate of the pixel 410 is (6,6) in the destination image. The horizontal coordinate and the vertical coordinate of the interpolation point DST, the first parameter, the second parameter, the horizontal magnification factor HF, and the vertical magnification factor VF may be substituted into the above formula 1 and 2 to respectively obtain the horizontal determination parameter and the vertical determination parameter:

$$H_{DP}=((6*2)/3)\mathrm{mod}(2*1)=0;\text{and}$$

$$V_{DP}=((6*2)/3)\mathrm{mod}(2*1)=0;$$

wherein, H_DP and V_DP represent the horizontal determination parameter and the vertical determination parameter, and the decimal values of the dividing result is rounded off. Then, the horizontal determination parameter and the vertical determination parameter are determined not to be greater than or equal to the second parameter and the reordering mode is generated to indicate not to perform the horizontal reorder and the vertical reorder.

Similarly, when the interpolation point DST is pixel 411, the coordinate of the pixel 411 is (8,6) to be substituted into the above formula 1 and formula 2 for respectively obtaining the horizontal determination parameter and the vertical determination parameter, which are 1 and 0. Thus, the reordering mode is determined to indicate only to perform the horizontal reorder. When the interpolation point DST is pixel 412, the coordinate of the pixel 412 is (6,8) to be substituted into the above formula 1 and formula 2 for respectively obtaining the horizontal determination parameter and the vertical determination parameter, which are 0 and 1. Thus, the reordering mode is determined to indicate only to perform the vertical reorder. When the interpolation point DST is pixel 413, the coordinate of the pixel 413 is (8,8) to be substituted into the above formula 1 and formula 2 for respectively obtaining the horizontal determination parameter and the vertical determination parameter, which are 1 and 1. Thus, the reordering mode is determined to indicate to perform the horizontal reorder and the vertical reorder.

Furthermore, please refer to FIG. 5, which is a schematic diagram of an input data 500 from the source data in FIG. 4 performed the computation according to the reordering and interpolation calculating process 30. The input data 500 includes pixel values of the pixels 400-408 in the source data 110. The input data 500 is reordered according to the reordering mode to generate reordering data 502, and then the interpolation computation is performed on the reordering data 502 to generate computation data 504. Finally, the computation data 504 is reordered according to the reordering mode to generate output data 506 for generating the pixel values of the pixels 410-413. Note that, the input data 500 includes pixel values Im(0)-Im(8), the reordering data 502 includes pixel values Ir(0)-Ir(8), the computation data 504 includes pixel values Iu(0)-Iu(8), and the output data 506 includes pixel values Io(0)-Io(8).

First, when the interpolation point DST is the pixel 410, the reordering mode indicates not to perform the horizontal reorder and the vertical reorder, the reordering data 502 is generated by performing Ir(0)=Im(0), Ir(1)=Im(1), Ir(2)=Im(2), Ir(3)=Im(3), Ir(4)=Im(4), Ir(5)=Im(5), Ir(6)=Im(6), Ir(7)=Im(7), and Ir(8)=Im(8). Similarly, when the interpolation point DST is the pixel 411, the reordering mode indicates only to perform the horizontal reorder, the reordering data 502 is generated by performing Ir(0)=Im(2), Ir(1)=Im(1), Ir(2)=Im(0), Ir(3)=Im(5), Ir(4)=Im(4), Ir(5)=Im(3), Ir(6)=Im(8), Ir(7)=Im(7), and Ir(8)=Im(6). When the interpolation point DST is the pixel 412, the reordering mode indicates only to perform the vertical reorder, the reordering data 502 is generated by performing Ir(0)=Im(6), Ir(1)=Im(7), Ir(2)=Im(8), Ir(3)=Im(3), Ir(4)=Im(4), Ir(5)=Im(5), Ir(6)=Im(0), Ir(7)=Im(1), and Ir(8)=Im(2). When the interpolation point DST is the pixel 413, the reordering mode indicates to perform the horizontal reorder and the vertical reorder, the reordering data 502 is generated by performing Ir(0)=Im(8), Ir(1)=Im(7), Ir(2)=Im(6), Ir(3)=Im(5), Ir(4)=Im(4), Ir(5)=Im(3), Ir(6)=Im(2), Ir(7)=Im(1), and Ir(8)=Im(0).

Then, the reordering data 502 is performed upon by the following computation to generate the computation data 504:

$$Iu(0)=Ir(3)*H+Ir(1)*V+Ir(4)*C+Ir(0)*D;$$

$$Iu(1)=Ir(5)*H+Ir(1)*V+Ir(4)*C+Ir(2)*D;$$

$$Iu(2)=Ir(4)*H+Ir(2)*V+Ir(5)*C+Ir(1)*D;$$

$$Iu(3)=Ir(3)*H+Ir(7)*V+Ir(4)*C+Ir(6)*D;$$

$$Iu(4)=Ir(5)*H+Ir(7)*V+Ir(4)*C+Ir(8)*D;$$

$$Iu(5)=Ir(4)*H+Ir(8)*V+Ir(5)*C+Ir(7)*D;$$

$$Iu(6)=Ir(6)*H+Ir(4)*V+Ir(7)*C+Ir(3)*D;$$

$$Iu(7)=Ir(8)*H+Ir(4)*V+Ir(7)*C+Ir(5)*D; \text{and}$$

$$Iu(8)=Ir(7)*H+Ir(5)*V+Ir(8)*C+Ir(4)*D;$$

wherein H represents a horizontal interpolation coefficient, V represents a vertical interpolation coefficient, C represents a diagonal interpolation coefficient, and D represents an extensible interpolation coefficient. The interpolation coefficient H, V, C, and D are predefined values, which may also be modified according to the requirement and are not limited.

Next, reordering of the computation data 504 is performed according to the reordering mode. When the interpolation point DST is the pixel 410, the reordering mode indicates not to perform the horizontal reorder and the vertical reorder, the output data 506 is generated by performing Io(0)=Iu(0), Io(1)=Iu(1), Io(2)=Iu(2), Io(3)=Iu(3), Io(4)=Iu(4), Io(5)=Iu(5), Io(6)=Iu(6), Io(7)=Iu(7), and Io(8)=Iu(8). When the interpolation point DST is the pixel 411, the reordering mode indicates only to perform the horizontal reorder, the output data 506 is generated by performing Io(0)=Iu(2), Io(1)=Iu(1), Io(2)=Iu(0), Io(3)=Iu(5), Io(4)=Iu(4), Io(5)=Iu(3), Io(6)=Iu(8), Io(7)=Iu(7), and Io(8)=Iu(6). When the interpolation point DST is the pixel 412, the reordering mode indicates only to perform the vertical reorder, the output data 506 is generated by performing Io(0)=Iu(6), Io(1)=Iu(7), Io(2)=Iu(8), Io(3)=Iu(3), Io(4)=Iu(4), Io(5)=Iu(5), Io(6)=Iu(0), Io(7)=Iu(1), and Io(8)=Iu(2). When the interpolation point DST is the pixel 413, since the reordering mode indicates to perform the horizontal reorder and the vertical reorder, the output data 506 is generated by performing Io(0)=Iu(8), Io(1)=Iu(7), Io(2)=Iu(6), Io(3)=Iu(5), Io(4)=Iu(4), Io(5)=Iu(3), Io(6)=Iu(2), Io(7)=Iu(1), and Io(8)=Iu(0).

Finally, the generated output data 506 includes the pixel values Io(0)-Io(8), and the pixel value Io(4) is selected as the interpolation data of the interpolation point DST, which may be the pixel value of the pixel 410, 411, 412, or 413.

As a result, in the embodiment, the data interpolation process 20 performs the reordering and interpolation calculating process once to generate the interpolation data of the interpolation point DST in the destination data 112. The input data 500 includes 9 pixels obtained by the interpolation position of the interpolation point DST. The reordering data 502, the computation data 504, and the output data 506 utilized in the reordering and interpolation calculating process 30 also includes 9 pixels. Thus, the data interpolation process 20 may easily obtain the interpolation data of the interpolation point DST. In addition, the reordering, computing, and reordering are performed on the input data to generate the interpolation data and then the interpolation data may be more accurate.

Furthermore, in another embodiment, the source data 110 and the destination data 112 are similarly shown in FIG. 4. When the data interpolation process 20 includes two reordering and interpolation calculating processes, the reordering and interpolation calculating may be performed twice on the input data obtained from the source data 110 according to the reordering and interpolation calculating process 30. Similarly, the first parameter and the second parameter are required to be calculated for determining the reordering mode of each reordering and interpolation calculating process. The first parameter of the first process may be obtained to be 4 by calculating 2 to power of the process amount (i.e. 2), and the second parameter of the first process may be obtained to be as 1 by calculating 2 to power of the value of the process order minus 1 (i.e. 0). The first parameter of the second process may be obtained to be 4 by calculating 2 to power of the process amount (i.e. 2), and the second parameter of the second process may be obtained to be 2 by calculating 2 to power of the value of the process order minus 1 (i.e. 1).

Next, for the first process, when the interpolation point DST is one of the pixels 410-413, the horizontal coordinate and the vertical coordinate of the interpolation point DST, the first parameter of the first process, the second parameter of the first process, the horizontal magnification factor HF, and the vertical magnification factor VF may be substituted into the above formula 1 and formula 2 to obtain the horizontal determination parameter and the vertical determination parameter of the first process, so as to obtain the reordering mode of the first process. For the second process, when the interpolation point DST is one of the pixels 410-413, the horizontal coordinate and the vertical coordinate of the interpolation point DST, the first parameter of the second process, the second parameter of the second process, the horizontal magnification factor HF, and the vertical magnification factor VF may also be substituted into the above formula 1 and formula 2 to obtain the horizontal determination parameter and the vertical determination parameter of the second process, so as to obtain the reordering mode of the second process.

Then, the first process and the second process may perform the above-mentioned computation corresponding to the input data, the reordering data, the computation data, and the output data according to the corresponding reordering mode. The detailed operations of the computation are the same with the above-mentioned embodiment, and the description may be referred to in the above paragraphs and FIG. 5, which will not be narrated hereinafter. Noticeably, the input data required for the first process is different from the input data required for the second process. The input data of the first process is obtained from the source data 110, and the input data of the second process is the output data generated by the first process. Finally, the interpolation data of the interpolation point DST is selected from the output data of the second process, which may be the pixel value of the pixel 410, 411, 412, or 413.

As a result, in the embodiment, the data interpolation process 20 performs the reordering and interpolation calculating process twice to generate the interpolation data of the interpolation point DST in the destination data 112. The input data, the reordering data, the computation data, and the output data utilized in each reordering and interpolation calculating process only include 9 pixels. Thus, the interpolation data of the interpolation point DST may be easily obtained in the multiple reordering and interpolation calculating processes. In addition, since the operations of each process are the same and only the input data of each process are different, the computations are regular and easily implemented by the hardware. Meanwhile, since each process performs reordering and interpolation calculating according to the interpolation position and the process order, when the horizontal magnification factor HF and the vertical magnification factor VF are larger, the interpolation data with larger magnification factor may be accurately generated by continuously performing multiple reordering and interpolation calculating processes.

Specifically, in the present invention, the input data required for computing the interpolation data of the interpolation point DST is obtained from the source data according to the interpolation position of the interpolation point DST, the horizontal magnification factor HF, and the vertical magnification factor VF. Additionally, the input data is performed upon by the at least one reordering and interpolation calculating process with different reordering modes according to the interpolation position, the horizontal magnification factor HF, the vertical magnification factor VF, the process amount, and the process order to obtain the accurate interpolation data. Those skilled in the art can make modifications or alterations accordingly.

For example, in the embodiment, the data interpolation system 10 includes the process 100 and the storage device 102. The data interpolation process 20 is compiled as the program code 104, which is stored in the storage device 102 for controlling the processor 100 to read the source data 100 and perform computing for generating the interpolation data 114. In other embodiment, since the computations of the data interpolation process 20 are regular, the computations of the data interpolation process 20 may also be directly implemented by an ASIC in the data interpolation system 10. Moreover, the at least one reordering and interpolation calculating process of the data interpolation process 20 may also be performed by cascade by at least one reordering and interpolation calculating module in the data interpolation system 10, which can make modifications and alterations accordingly and is not limited.

Additionally, in the embodiment, the horizontal magnification factor HF and the vertical magnification factor VF are integer, such as 3. In other embodiment, the horizontal magnification factor HF and the vertical magnification factor VF may also be non-integer, such as 2.5. Similarly, the reference pixel coordinate and the related parameter for determining the reordering mode may also be obtained according to the above-mentioned formulas, so as to obtain the interpolation data, which is not limited.

In summary, in the prior art, since the pixel values of the multiple pixels corresponding to the interpolation pixel are directly summed and averaged, or the pixel values of the multiple pixels are multiplied by the ratios, summed and averaged to calculate the pixel value of the interpolation pixel. Under such a condition, the visible stripes and blocks may appear in the interpolated high-resolution image. In comparison, in the present invention, the input data required for generating the interpolation data are reordered according to the corresponding positions, and then the reordered data is utilized when performing the interpolation computation to generate the interpolation data of the interpolation point. Thus, the visible stripes and blocks may not appear in the interpolated destination image, and the accuracy of the data interpolation may be increased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pixel value interpolation method, for obtaining a pixel value of an interpolation pixel in a destination image, wherein the number of pixels of the destination image has a horizontal magnification factor and a vertical magnification factor with respect to the number of pixels of a source image, the pixel value interpolation method comprising:

obtaining an input data which comprises a plurality of input pixel values of a plurality of pixels, from the source image, according to a position of the interpolation pixel in the destination image, the horizontal magnification factor, and the vertical magnification factor, wherein the step of obtaining the input data comprises:

obtaining a horizontal reference coordinate and a vertical reference coordinate, by dividing a horizontal coordinate of the interpolation pixel by the horizontal magnification factor and dividing a vertical coordinate of the interpolation pixel by the vertical magnification factor; and obtaining a plurality of pixel values of surrounding pixels in the source image located around a reference pixel which is in a position defined by the horizontal reference coordinate and the vertical reference coordinate, and taking the plurality of pixel values of the surrounding pixels to be the input data comprising the plurality of the input pixel values;

performing at least one reordering and interpolation calculating process on the plurality of input pixel values to obtain a plurality of output pixel values; and selecting an output pixel value from the plurality of output pixel values and outputting the output pixel value as the pixel value of the interpolation pixel.

2. The pixel value interpolation method of claim 1, wherein each reordering and interpolation calculating process of the at least one reordering and interpolation calculating process comprises:

determining a reordering mode according to the position of the interpolation pixel, the horizontal magnification factor, the vertical magnification factor, a first parameter, and a second parameter;

reordering a plurality of temporal input pixel values according to the reordering mode to generate a plurality of reordering pixel values;

performing computation on the plurality of reordering pixel values to generate a plurality of computation pixel values; and reordering the plurality of computation pixel values according to the reordering mode to generate a plurality of temporal output pixel values;

wherein the plurality of temporal input pixel values of the first reordering and interpolation calculating process in the at least one reordering and interpolation calculating process are the plurality of input pixel values, the plurality of temporal output pixel values of each reordering and interpolation calculating process are the plurality of temporal input pixel values of a next reordering and interpolation calculating process in the at least one reordering and interpolation calculating process, and the plurality of temporal output pixel values of a last reordering and interpolation calculating process in the at least one reordering and interpolation calculating process are the plurality of output pixel values; and wherein the first parameter is related to an amount of the at least one reordering and interpolation calculating process, and the second parameter is related to an order of each reordering and interpolation calculating process relative to the at least one reordering and interpolation calculating process.

3. The pixel value interpolation method of claim 2, wherein the step of determining the reordering mode according to the position of the interpolation pixel, the horizontal magnification factor, the vertical magnification factor, the first parameter, and the second parameter comprises:

a horizontal coordinate and a vertical coordinate corresponding to the position of the interpolation pixel respectively multiplied by the first parameter, divided by the horizontal magnification factor and the vertical magnification factor, divided by a value of the second parameter multiplied by 2, and calculated remainders obtaining a horizontal determination parameter and a vertical determination parameter;

determining whether the horizontal determination parameter is greater than or equal to the second parameter to generate a first determination result;

determining whether the vertical determination parameter is greater than or equal to the second parameter to generate a second determination result; and determining the reordering mode according to the first determination result and the second determination result.

4. The pixel value interpolation method of claim 3, wherein the step of determining the reordering mode according to the first determination result and the second determination result comprises:

determining the reordering mode to perform a horizontal reorder when the first determination result indicates the horizontal determination parameter is greater than or equal to the second parameter; and determining the reordering mode to perform a vertical reorder when the second determination result indicates the vertical determination parameter is greater than or equal to the second parameter.

5. The pixel value interpolation method of claim 4, wherein the plurality of temporal input pixel values comprises a first temporal input pixel value to a ninth temporal input pixel value, the plurality of reordering pixel values comprises a first reordering pixel value to a ninth reordering pixel value, the plurality of computation pixel values comprises a first computation pixel value to a ninth computation pixel value, the plurality of temporal output pixel values comprises a first temporal output pixel value to a ninth temporal output pixel value, and the plurality of output pixel values comprises a first output pixel value to a ninth output pixel value.

6. The pixel value interpolation method of claim 5, wherein the step of reordering the plurality of temporal input pixel value according to the reordering mode to generate the plurality of reordering pixel values comprises:

performing Ir(0)=Im(8), Ir(1)=Im(7), Ir(2)=Im(6), Ir(3)=Im(5), Ir(4)=Im(4), Ir(5)=Im(3), Ir(6)=Im(2), Ir(7)=Im(1), and Ir(8)=Im(0) when the reordering mode indicates to perform the horizontal reorder and the vertical reorder; or performing Ir(0)=Im(2), Ir(1)=Im(1), Ir(2)=Im(0), Ir(3)=Im(5), Ir(4)=Im(4), Ir(5)=Im(3), Ir(6)=Im(8), Ir(7)=Im(7), and Ir(8)=Im(6) when the reordering mode indicates only to perform the horizontal reorder; or performing Ir(0)=Im(6), Ir(1)=Im(7), Ir(2)=Im(8), Ir(3)=Im(3), Ir(4)=Im(4), Ir(5)=Im(5), Ir(6)=Im(0), Ir(7)=Im(1), and Ir(8)=Im(2) when the reordering mode indicates only to perform the vertical reorder; or performing Ir(0)=Im(0), Ir(1)=Im(1), Ir(2)=Im(2), Ir(3)=Im(3), Ir(4)=Im(4), Ir(5)=Im(5), Ir(6)=Im(6), Ir(7)=Im(7), and Ir(8)=Im(8) when the reordering mode indicates not to perform the horizontal reorder and the vertical reorder;

wherein Im(0)represents the first temporal input pixel value, Im(1) represents the second temporal input pixel value, Im(2) represents the third temporal input pixel value, Im(3) represents the fourth temporal input pixel value, Im(4) represents the fifth temporal input pixel value, Im(5) represents the sixth temporal input pixel value, Im(6) represents the seventh temporal input pixel value, Im(7) represents the eighth temporal input pixel value, and Im(8) represents the ninth temporal input pixel value; and wherein Ir(0) represents the first reordering pixel value, Ir(1) represents the second reordering pixel value, Ir(2) represents the third reordering pixel value, Ir(3) represents the fourth reordering pixel value, Ir(4) represents the fifth reordering pixel value, Ir(5) represents the sixth reordering pixel value, Ir(6) represents the seventh reordering pixel value, Ir(7) represents the eighth reordering pixel value, and Ir(8) represents the ninth reordering pixel value.

7. The pixel value interpolation method of claim 5, wherein the step of performing the computation on the plurality of reordering pixel values to generate the plurality of computation pixel values comprises:

performing following steps to generate the plurality of computation pixel values:

$$Iu(0)=Ir(3)*H+Ir(1)*V+Ir(4)*C+Ir(0)*D;$$

$$Iu(1)=Ir(5)*H+Ir(1)*V+Ir(4)*C+Ir(2)*D;$$

$$Iu(2)=Ir(4)*H+Ir(2)*V+Ir(5)*C+Ir(1)*D;$$

$$Iu(3)=Ir(3)*H+Ir(7)*V+Ir(4)*C+Ir(6)*D;$$

$$Iu(4)=Ir(5)*H+Ir(7)*V+Ir(4)*C+Ir(8)*D;$$

$$Iu(5)=Ir(4)*H+Ir(8)*V+Ir(5)*C+Ir(7)*D;$$

$$Iu(6)=Ir(6)*H+Ir(4)*V+Ir(7)*C+Ir(3)*D;$$

$$Iu(7)=Ir(8)*H+Ir(4)*V+Ir(7)*C+Ir(5)*D;\text{and}$$

$$Iu(8)=Ir(7)*H+Ir(5)*V+Ir(8)*C+Ir(4)*D;$$

wherein Ir(0) represents the first reordering pixel value, Ir(1) represents the second reordering pixel value, Ir(2) represents the third reordering pixel value, Ir(3) represents the fourth reordering pixel value, Ir(4) represents the fifth reordering pixel value, Ir(5) represents the sixth reordering pixel value, Ir(6) represents the seventh reordering pixel value, Ir(7) represents the eighth reordering pixel value, and Ir(8) represents the ninth reordering pixel value;

wherein Iu(0) represents the first computation pixel value, Iu(1) represents the second computation pixel value, Iu(2) represents the third computation pixel value, Iu(3) represents the fourth computation pixel value, Iu(4) represents the fifth computation pixel value, Iu(5) represents the sixth computation pixel value, Iu(6) represents the seventh computation pixel value, Iu(7) represents the eighth computation pixel value, and Iu(8) represents the ninth computation pixel value; and wherein H represents a horizontal interpolation coefficient, V represents a vertical interpolation coefficient, C represents a diagonal interpolation coefficient, and D represents an extensible interpolation coefficient.

8. The pixel value interpolation method of claim 5, wherein the step of reordering the plurality of computation pixel values according to the reordering mode to generate the plurality of temporal output pixel values comprises:

performing Io(0)=Iu(8), Io(1)=Iu(7), Io(2)=Iu(6), Io(3)=Iu(5), Io(4)=Iu(4), Io(5)=Iu(3), Io(6)=Iu(2), Io(7)=Iu(1), and Io(8)=Iu(0) when the reordering mode indicates to perform the horizontal reorder and the vertical reorder; or performing Io(0)=Iu(2), Io(1)=Iu(1), Io(2)=Iu(0), Io(3)=Iu(5), Io(4)=Iu(4), Io(5)=Iu(3), Io(6)=Iu(8), Io(7)=Iu(7), and Io(8)=Iu(6) when the reordering mode indicates only to perform the horizontal reorder; or performing Io(0)=Iu(6), Io(1)=Iu(7), Io(2)=Iu(8), Io(3)=Iu(3), Io(4)=Iu(4), Io(5)=Iu(5), Io(6)=Iu(0), Io(7)=Iu(1), and Io(8)=Iu(2) when the reordering mode indicates only to perform the vertical reorder; or performing Io(0)=Iu(0), Io(1)=Iu(1), Io(2)=Iu(2), Io(3)=Iu(3), Io(4)=Iu(4), Io(5)=Iu(5), Io(6)=Iu(6), Io(7)=Iu(7), and Io(8)=Iu(8) when the reordering mode indicates not to perform the horizontal reorder and the vertical reorder;

wherein Iu(1) represents the second computation pixel value, Iu(2) represents the third computation pixel value, Iu(3) represents the fourth computation pixel value, Iu(4) represents the fifth computation pixel value, Iu(5) represents the sixth computation pixel value, Iu(6) represents the seventh computation pixel value, Iu(7) represents the eighth computation pixel value, and Iu(8) represents the ninth computation pixel value; and wherein Io(0) represents the first temporal output pixel value, Io(1) represents the second temporal output pixel value, Io(2) represents the third temporal output pixel value, Io(3) represents the fourth temporal output pixel value, Io(4) represents the fifth temporal output pixel value, Io(5) represents the sixth temporal output pixel value, Io(6) represents the seventh temporal output pixel value, Io(7) represents the eighth temporal output pixel value, and Io(8) represents the ninth temporal output pixel value.

9. The pixel value interpolation method of claim 5, wherein the step of selecting the output pixel value from the plurality of output pixel values and outputting the output pixel value as the pixel value of the interpolation pixel comprises:

selecting the fifth output pixel value as the pixel value of the interpolation pixel.

10. A pixel value interpolation system, for obtaining a pixel value of an interpolation pixel in a destination image, wherein the number of pixels of the destination image has a horizontal magnification factor and a vertical magnification factor with respect to the number of pixels of a source image, the data interpolation system comprising:

a processor; and a storage device, storing a program code for indicating to the processor to perform a pixel value interpolation method, and the pixel value interpolation method comprising:

obtaining an input data which comprises a plurality of input pixel values of a plurality of pixels, from the source image, according to a position of the interpolation pixel in the destination image, the horizontal magnification factor, and the vertical magnification factor, wherein the step of obtaining the input data comprises:

obtaining a horizontal reference coordinate and a vertical reference coordinate, by dividing a horizontal coordinate of the interpolation pixel by the horizontal magnification factor and dividing a vertical coordinate of the interpolation pixel by the vertical magnification factor; and obtaining a plurality of pixel values of surrounding pixels in the source image located around a reference pixel which is in a position defined by the horizontal reference coordinate and the vertical reference coordinate, and taking the plurality of pixel values of the surrounding pixels to be the input data comprising the plurality of the input pixel values;

performing at least one reordering and interpolation calculating process on the plurality of input pixel values to obtain a plurality of output pixel values; and selecting an output pixel value from the plurality of output pixel values and outputting the output pixel value as the pixel value of the interpolation pixel.

11. The pixel value interpolation system of claim 10, wherein each reordering and interpolation calculating process of the at least one reordering and interpolation calculating process comprises:

determining a reordering mode according to the position of the interpolation pixel, the horizontal magnification factor, the vertical magnification factor, a first parameter, and a second parameter;

reordering a plurality of temporal input pixel values according to the reordering mode to generate a plurality of reordering pixel values;

performing computation on the plurality of reordering pixel values to generate a plurality of computation pixel values; and reordering the plurality of computation pixel values according to the reordering mode to generate a plurality of temporal output pixel values;

wherein the plurality of temporal input pixel values of the first reordering and interpolation calculating process in the at least one reordering and interpolation calculating process are the plurality of input pixel values, the plurality of temporal output pixel values of each reordering and interpolation calculating process are the plurality of temporal input pixel values of a next reordering and interpolation calculating process in the at least one reordering and interpolation calculating process, and the plurality of temporal output pixel values of a last reordering and interpolation calculating process in the at least one reordering and interpolation calculating process are the plurality of output pixel values; and wherein the first parameter is related to an amount of the at least one reordering and interpolation calculating process, and the second parameter is related to an order of each reordering and interpolation calculating process relative to the at least one reordering and interpolation calculating process.

12. The pixel value interpolation system of claim 11, wherein the step of determining the reordering mode according to the position of the interpolation pixel, the horizontal magnification factor, the vertical magnification factor, the first parameter, and the second parameter comprises:

a horizontal coordinate and a vertical coordinate corresponding to the position of the interpolation pixel respectively multiplied by the first parameter, divided by the horizontal magnification factor and the vertical magnification factor, divided by a value of the second parameter multiplied by 2, and calculated remainders obtaining a horizontal determination parameter and a vertical determination parameter;

determining whether the horizontal determination parameter is greater than or equal to the second parameter to generate a first determination result;

determining whether the vertical determination parameter is greater than or equal to the second parameter to generate a second determination result; and determining the reordering mode according to the first determination result and the second determination result.

13. The pixel value interpolation system of claim 12, wherein the step of determining the reordering mode according to the first determination result and the second determination result comprises:

determining the reordering mode to perform a horizontal reorder when the first determination result indicates the horizontal determination parameter is greater than or equal to the second parameter; and determining the reordering mode to perform a vertical reorder when the second determination result indicates the vertical determination parameter is greater than or equal to the second parameter.

14. The pixel value interpolation system of claim 13, wherein the plurality of temporal input pixel values comprises a first temporal input pixel value to a ninth temporal input pixel value, the plurality of reordering pixel values comprises a first reordering pixel value to a ninth reordering pixel value, the plurality of computation pixel values comprises a first computation pixel value to a ninth computation pixel value, the plurality of temporal output pixel values comprises a first temporal output pixel value to a ninth temporal output pixel value, and the plurality of output pixel values comprises a first output pixel value to a ninth output pixel value.

15. The pixel value interpolation system of claim 14, wherein the step of reordering the plurality of temporal input pixel value according to the reordering mode to generate the plurality of reordering pixel values comprises:

performing Ir(0)=Im(8), Ir(1)=Im(7), Ir(2)=Im(6), Ir(3)=Im(5), Ir(4)=Im(4), Ir(5)=Im(3), Ir(6)=Im(2), Ir(7)=Im(1), and Ir(8)=Im(0) when the reordering mode indicates to perform the horizontal reorder and the vertical reorder; or performing Ir(0)=Im(2), Ir(1)=Im(1), Ir(2)=Im(0), Ir(3)=Im(5), Ir(4)=Im(4), Ir(5)=Im(3), Ir(6)=Im(8), Ir(7)=Im(7), and Ir(8)=Im(6) when the reordering mode indicates only to perform the horizontal reorder; or performing Ir(0)=Im(6), Ir(1)=Im(7), Ir(2)=Im(8), Ir(3)=Im(3), Ir(4)=Im(4), Ir(5)=Im(5), Ir(6)=Im(0), Ir(7)=Im(1), and Ir(8)=Im(2) when the reordering mode indicates only to perform the vertical reorder; or performing Ir(0)=Im(0), Ir(1)=Im(1), Ir(2)=Im(2), Ir(3)=Im(3), Ir(4)=Im(4), Ir(5)=Im(5), Ir(6)=Im(6), Ir(7)=Im(7), and Ir(8)=Im(8) when the reordering mode indicates not to perform the horizontal reorder and the vertical reorder;

wherein Im(0)represents the first temporal input pixel value, Im(1) represents the second temporal input pixel value, Im(2) represents the third temporal input pixel value, Im(3) represents the fourth temporal input pixel value, Im(4) represents the fifth temporal input pixel value, Im(5) represents the sixth temporal input pixel value, Im(6) represents the seventh temporal input pixel value, Im(7) represents the eighth temporal input pixel value, and Im(8) represents the ninth temporal input pixel value; and wherein Ir(0) represents the first reordering pixel value, Ir(1) represents the second reordering pixel value, Ir(2) represents the third reordering pixel value, Ir(3) represents the fourth reordering pixel value, Ir(4) represents the fifth reordering pixel value, Ir(5) represents the sixth reordering pixel value, Ir(6) represents the seventh reordering pixel value, Ir(7) represents the eighth reordering pixel value, and Ir(8) represents the ninth reordering pixel value.

16. The pixel value interpolation system of claim 14, wherein the step of performing the computation on the plurality of reordering pixel values to generate the plurality of computation pixel values comprises:

performing following steps to generate the plurality of computation pixel values:

$$Iu(0)=Ir(3)*H+Ir(1)*V+Ir(4)*C+Ir(0)*D;$$

$$Iu(1)=Ir(5)*H+Ir(1)*V+Ir(4)*C+Ir(2)*D;$$

$$Iu(2)=Ir(4)*H+Ir(2)*V+Ir(5)*C+Ir(1)*D;$$

$$Iu(3)=Ir(3)*H+Ir(7)*V+Ir(4)*C+Ir(6)*D;$$

$$Iu(4)=Ir(5)*H+Ir(7)*V+Ir(4)*C+Ir(8)*D;$$

$$Iu(5)=Ir(4)*H+Ir(8)*V+Ir(5)*C+Ir(7)*D;$$

$$Iu(6)=Ir(6)*H+Ir(4)*V+Ir(7)*C+Ir(3)*D;$$

$$Iu(7)=Ir(8)*H+Ir(4)*V+Ir(7)*C+Ir(5)*D;\text{and}$$

$$Iu(8)=Ir(7)*H+Ir(5)*V+Ir(8)*C+Ir(4)*D;$$

wherein Ir(0) represents the first reordering pixel value, Ir(1) represents the second reordering pixel value, Ir(2) represents the third reordering pixel value, Ir(3) represents the fourth reordering pixel value, Ir(4) represents the fifth reordering pixel value, Ir(5) represents the sixth reordering pixel value, Ir(6) represents the seventh reordering pixel value, Ir(7) represents the eighth reordering pixel value, and Ir(8) represents the ninth reordering pixel value;

wherein Iu(0) represents the first computation pixel value, Iu(1) represents the second computation pixel value, Iu(2) represents the third computation pixel value, Iu(3) represents the fourth computation pixel value, Iu(4) represents the fifth computation pixel value, Iu(5) represents the sixth computation pixel value, Iu(6) represents the seventh computation pixel value, Iu(7) represents the eighth computation pixel value, and Iu(8) represents the ninth computation pixel value; and wherein H represents a horizontal interpolation coefficient, V represents a vertical interpolation coefficient, C represents a diagonal interpolation coefficient, and D represents an extensible interpolation coefficient.

17. The pixel value interpolation system of claim 14, wherein the step of reordering the plurality of computation pixel values according to the reordering mode to generate the plurality of temporal output pixel values comprises:

performing Io(0)=Iu(8), Io(1)=Iu(7), Io(2)=Iu(6), Io(3)=Iu(5), Io(4)=Iu(4), Io(5)=Iu(3), Io(6)=Iu(2), Io(7)=Iu(1), and Io(8)=Iu(0) when the reordering mode indicates to perform the horizontal reorder and the vertical reorder; or performing Io(0)=Iu(2), Io(1)=Iu(1), Io(2)=Iu(0), Io(3)=Iu(5), Io(4)=Iu(4), Io(5)=Iu(3), Io(6)=Iu(8), Io(7)=Iu(7), and Io(8)=Iu(6) when the reordering mode indicates only to perform the horizontal reorder; or performing Io(0)=Iu(6), Io(1)=Iu(7), Io(2)=Iu(8), Io(3)=Iu(3), Io(4)=Iu(4), Io(5)=Iu(5), Io(6)=Iu(0), Io(7)=Iu(1), and Io(8)=Iu(2) when the reordering mode indicates only to perform the vertical reorder; or performing Io(0)=Iu(0), Io(1)=Iu(1), Io(2)=Iu(2), Io(3)=Iu(3), Io(4)=Iu(4), Io(5)=Iu(5), Io(6)=Iu(6), Io(7)=Iu(7), and Io(8)=Iu(8) when the reordering mode indicates not to perform the horizontal reorder and the vertical reorder;

wherein Iu(1) represents the second computation pixel value, Iu(2) represents the third computation pixel value, Iu(3) represents the fourth computation pixel value, Iu(4) represents the fifth computation pixel value, Iu(5) represents the sixth computation pixel value, Iu(6) represents the seventh computation pixel value, Iu(7) represents the eighth computation pixel value, and Iu(8) represents the ninth computation pixel value; and wherein Io(0) represents the first temporal output pixel value, Io(1) represents the second temporal output pixel value, Io(2) represents the third temporal output pixel value, Io(3) represents the fourth temporal output pixel value, Io(4) represents the fifth temporal output pixel value, Io(5) represents the sixth temporal output pixel value, Io(6) represents the seventh temporal output pixel value, Io(7) represents the eighth temporal output pixel value, and Io(8) represents the ninth temporal output pixel value.

18. The pixel value interpolation system of claim 14, wherein the step of selecting the output pixel value from the plurality of output pixel values and outputting the output pixel value as the pixel value of the interpolation pixel comprises:

selecting the fifth output pixel value as the pixel value of the interpolation pixel.

* * * * *